(12) United States Patent
Li et al.

(10) Patent No.: US 12,231,931 B2
(45) Date of Patent: Feb. 18, 2025

(54) SIGNAL MEASUREMENT METHOD, TERMINAL, AND NETWORK SIDE DEVICE

(71) Applicant: DATANG MOBILE COMMUNICATIONS EQUIPMENT CO., LTD, Beijing (CN)

(72) Inventors: Hui Li, Beijing (CN); Ren Da, Beijing (CN); Deshan Miao, Beijing (CN); Bin Ren, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 415 days.

(21) Appl. No.: 17/764,217

(22) PCT Filed: Aug. 31, 2020

(86) PCT No.: PCT/CN2020/112589
§ 371 (c)(1),
(2) Date: Mar. 28, 2022

(87) PCT Pub. No.: WO2021/057397
PCT Pub. Date: Apr. 1, 2021

(65) Prior Publication Data
US 2022/0353715 A1 Nov. 3, 2022

(30) Foreign Application Priority Data
Sep. 29, 2019 (CN) .......................... 201910937058.1

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
CPC .............................. H04W 24/08; H04W 24/10
See application file for complete search history.

(56) References Cited

U.S. PATENT DOCUMENTS

2016/0373992 A1* 12/2016 Jung ................. H04W 36/0094
2018/0192371 A1   7/2018 Jung et al.
(Continued)

FOREIGN PATENT DOCUMENTS

| CN | 103220703 A | 7/2013 |
| CN | 104769992 A | 7/2015 |

(Continued)

OTHER PUBLICATIONS

Discussion on beam measurement, beam reporting and beam indication, 3GPP TSG RAN WG1 NR Ad Hoc #3, R1-1715619, Vivo, 2017.

*Primary Examiner* — Brenda H Pham
(74) *Attorney, Agent, or Firm* — Bayramoglu Law Offices LLC

(57) ABSTRACT

A method for signal measuring, a terminal and a network-side device are provided. The method is applied to a terminal, and the method includes: receiving a measurement-configuration information sent by a network-side device, wherein the measurement-configuration information contains at least a reported group quantity of a measured value of a target measurement parameter, and the target measurement parameter refers to a parameter of a target measurement signal; according to the measurement-configuration information, measuring the target measurement parameter; and sending the measured value of the target measurement parameter to the network-side device. The embodiments of the method solve the problem that, in the conventional 5G NR system, the configuration information for reference signals has not been complete.

12 Claims, 3 Drawing Sheets

(56) References Cited

U.S. PATENT DOCUMENTS

2018/0323845 A1  11/2018  Chang et al.
2018/0324678 A1  11/2018  Chen et al.

FOREIGN PATENT DOCUMENTS

| CN | 105657730 | A  | 6/2016 |
| CN | 108632838 | A  | 10/2018 |
| CN | 108832938 | A  | 11/2018 |
| CN | 109975619 | A  | 7/2019 |
| WO | 2018085601 | A1 | 5/2018 |

* cited by examiner

SIGNAL MEASUREMENT METHOD, TERMINAL, AND NETWORK SIDE DEVICE

CROSS REFERENCE TO TILE RELATED APPLICATIONS

This application is the national stage entry of International Application No. PCT/CN2020/112589, filed on Aug. 31, 2020, which is based upon and claims priority to Chinese Patent Application No. 201910937058.1 filed on Sep. 29, 2019, the entire contents of which are incorporated herein by reference.

TECHNICAL FIELD

The present disclosure relates to the technical field of communication, and particularly relates to a signal measuring method, a terminal and a network-side device.

BACKGROUND

In a 5th Generation New Radio (5G NR) system, a network-side device is configured for a terminal (User Equipment, UE) a measurement-configuration information for measuring a reference signal. Taking positioning measurement as an example, during the measuring process, the network-side device sends a plurality of downlink positioning reference signals (Positioning Reference Signal, PRS), and each of the positioning reference signals points to different directions after beamforming; in other words, each of the PRS signals corresponds to one beam. The terminal measures by measuring each of the beams, to obtain the corresponding measured parameters, and reports the measured parameters.

However, in the conventional 5G NR, the configuration information for reference signals is not yet perfect, and some scenes that cannot be matched exist. For example, the conventional configuration information cannot match terminals having a plurality of arrays in the 5G NR.

SUMMARY

The embodiments of the present disclosure provide a signal measuring method, a terminal and a network-side device, to solve the problem that, in the conventional 5G NR system, the configuration information for reference signals has not been complete.

In a first aspect, an embodiment of the present disclosure provides a signal measuring method, applied to a terminal, wherein the method comprises:

receiving a measurement-configuration information sent by a network-side device, wherein the measurement-configuration information includes at least a reported group quantity of a measured value of a target measurement parameter, and the target measurement parameter refers to a parameter of a target measurement signal;

according to the measurement-configuration information, measuring the target measurement parameter; and sending the measured value of the target measurement parameter to the network-side device.

Optionally, in the measurement-configuration information, the reported group quantity of at least one of the target measurement parameters is at least two.

Optionally, the step of sending the measured value of the target measurement parameter to the network-side device comprises:

according to the reported group quantity, grouping the measured values of the target measurement parameter, wherein the measured values in a same one group are measured by a same one antenna array of the terminal; and sending each of the groups of the measured values individually to the network-side device.

Optionally, the target measurement parameter includes at least one of a reference-signal time difference RSTD, a reference-signal receiving power RSRP, an angle of arrival AOA or a receiving-transmitting time difference RTTD.

Optionally, the target measurement signal includes at least one of a downlink positioning reference signal PRS, a channel-state-information reference signal CSI-RS and a tracking reference signal TRS.

In a second aspect, an embodiment of the present disclosure further provides a signal measuring method, applied to a network-side device, wherein the method includes:

sending a measurement-configuration information to a terminal, wherein the measurement-configuration information contains at least a reported group quantity of a measured value of a target measurement parameter, and the target measurement parameter refers to a parameter of a target measurement signal; and receiving a measured value obtained after the terminal measures the target measurement parameter.

Optionally, in the measurement-configuration information, the reported group quantity of at least one of the target measurement parameters is at least two.

Optionally, after the step of receiving the measured value obtained after the terminal measures the target measurement parameter, the method comprises:

according to the measured value of the target measurement parameter, positioning the terminal.

Optionally, the target measurement parameter includes at least one of a reference-signal time difference RSTD, a reference-signal receiving power RSRP, an angle of arrival AOA or a receiving-transmitting time difference RTTD.

Optionally, the target measurement signal includes at least one of a downlink positioning reference signal PRS, a channel-state-information reference signal CSI-RS and a tracking reference signal TRS.

In a third aspect, an embodiment of the present disclosure further provides a terminal comprising a transceiver, a memory, a processor and a computer program that is stored in the memory and is executable in the processor, wherein the processor, when executing the computer program, performs the following steps:

receiving a measurement-configuration information sent by a network-side device, wherein the measurement-configuration information contains at least a reported group quantity of a measured value of a target measurement parameter, and the target measurement parameter refers to a parameter of a target measurement signal;

according to the measurement-configuration information, measuring the target measurement parameter; and sending the measured value of the target measurement parameter to the network-side device.

Optionally, in the measurement-configuration information, the reported group quantity of at least one of the target measurement parameters is at least two.

Optionally, the processor, when executing the computer program, performs the following steps:

according to the reported group quantity, grouping the measured values of the target measurement parameter, wherein the measured values in a same one group are measured by a same one antenna array of the terminal; and sending each of the groups of the measured values individually to the network-side device.

Optionally, the target measurement parameter includes at least one of a reference-signal time difference RSTD, a reference-signal receiving power RSRP, an angle of arrival AOA or a receiving-transmitting time difference RTTD.

Optionally, the target measurement signal includes at least one of a downlink positioning reference signal PRS, a channel-state-information reference signal CSI-RS and a tracking reference signal TRS.

In a fourth aspect, an embodiment of the present disclosure further provides a network-side device, comprising a transceiver, a memory, a processor and a computer program that is stored in the memory and is executable in the processor, wherein the processor, when executing the computer program, performs the following steps:

sending a measurement-configuration information to a terminal, wherein the measurement-configuration information contains at least a reported group quantity of a measured value of a target measurement parameter, and the target measurement parameter refers to a parameter of a target measurement signal; and receiving a measured value obtained after the terminal measures the target measurement parameter.

Optionally, in the measurement-configuration information, the reported group quantity of at least one of the target measurement parameters is at least two.

Optionally, the processor, when executing the computer program, performs the following steps:

determining a positioning parameter among the target measurement parameters, wherein the positioning parameter refers to a target measurement parameter whose reported group quantity is at least two; and according to a measured value of the positioning parameter, performing multi-point positioning to the terminal.

Optionally, the target measurement parameter includes at least one of a reference-signal time difference RSTD, a reference-signal receiving power RSRP, an angle of arrival AOA or a receiving-transmitting time difference RTTD.

Optionally, the target measurement signal includes at least one of a downlink positioning reference signal PRS, a channel-state-information reference signal CSI-RS and a tracking reference signal TRS.

In a fifth aspect, an embodiment of the present disclosure further provides a signal measuring apparatus, applied to a terminal, wherein the apparatus includes:

an information receiving module configured for receiving a measurement-configuration information sent by a network-side device, wherein the measurement-configuration information contains at least a reported group quantity of a measured value of a target measurement parameter, and the target measurement parameter refers to a parameter of a target measurement signal;

a signal measuring module configured for, according to the measurement-configuration information, measuring the target measurement parameter; and a measured-value sending module configured for sending the measured value of the target measurement parameter to the network-side device.

In a sixth aspect, an embodiment of the present disclosure further provides a signal measuring apparatus, applied to a network-side device, wherein the apparatus comprises:

an information sending module configured for sending a measurement-configuration information to a terminal, wherein the measurement-configuration information contains at least a reported group quantity of a measured value of a target measurement parameter, and the target measurement parameter refers to a parameter of a target measurement signal; and a measured-value receiving module configured for receiving a measured value obtained after the terminal measures the target measurement parameter.

In a seventh aspect, an embodiment of the present disclosure further provides a computer-readable storage medium, wherein the computer-readable storage medium stores a computer program, and the computer program, when executed by a processor, implements the steps of the signal measuring method stated above.

In the embodiments of the present disclosure, receiving a measurement-configuration information sent by a network-side device, wherein the measurement-configuration information contains at least a reported group quantity of a measured value of a target measurement parameter, and the target measurement parameter refers to a parameter of a target measurement signal; according to the measurement-configuration information, measuring the target measurement parameter; and sending the measured value of the target measurement parameter to the network-side device. By providing the reported group quantity in the measurement-configuration information, flexible configuration of the group quantity when a single-array terminal and a multi-array terminal are reporting the measured values is realized. For a multi-array terminal, the measured values measured by each of the arrays may be grouped and then reported, to increase the measurement accuracy, and satisfy the demand on the measurement of a multi-array terminal in the 5G NR system.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

DETAILED DESCRIPTION OF THE EMBODIMENTS

Figure 1:
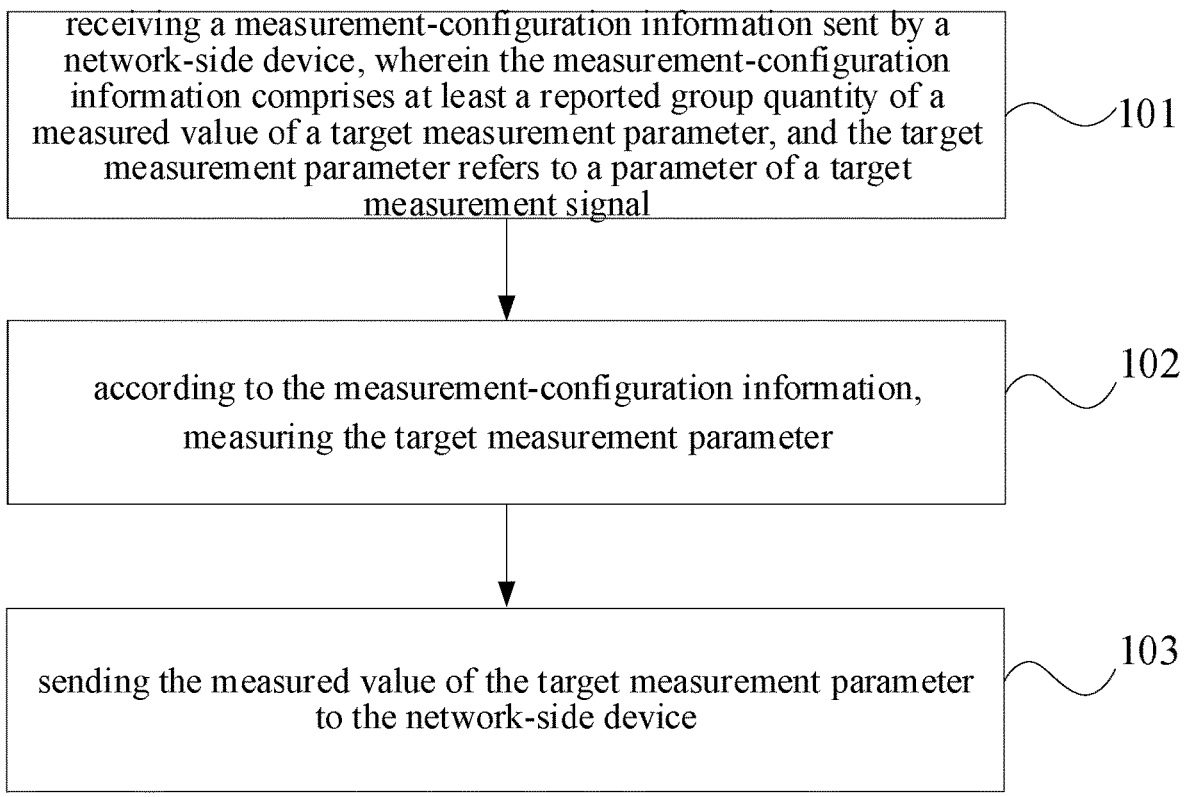
FIG. 1 shows a flow chart of the signal measuring method applied to a terminal according to an embodiment of the present disclosure.

Referring to FIG. 1, an embodiment of the present disclosure provides a signal measuring method, applied to a terminal, wherein the method comprises:

Step 101: receiving a measurement-configuration information sent by a network-side device, wherein the measurement-configuration information includes at least a reported group quantity of a measured value of a target measurement parameter, and the target measurement parameter refers to a parameter of a target measurement signal.

The network-side device may be a base station, a positioning server and so on. The network-side device refers to the measurement-configuration information for the terminal, wherein the measurement-configuration information is a configuration information for measuring the target measurement signal. The target measurement signal (type) may be a Positioning Reference Signal (PRS), or, a Channel State Information-Reference Signal (CSI-RS) and so on.

The target measurement parameter (type) may be a Reference-Signal Time Difference (RSTD), a Reference-Signal Receiving Power (RSRP) and so on.

The measurement-configuration information includes the target measurement parameter of the target measurement signal which the measurement-configuration information indicates the type of the measurement signal that the terminal requires to measure, i.e., the target measurement signal, and the type of the target measurement parameter of the target measurement signal. It can be understood that one or more of the target measurement signals and the target measurement parameters may be included in the measurement-configuration information.

The measurement-configuration information includes the reported group quantity of the measured values of the target measurement parameter. The reported group quantity refers to the group quantity that the terminal is required to report to the network-side device after the measurement on the target measurement parameter. The reported group quantity may be one or at least two groups. Particularly, for a terminal of a single array surface (the array refers to an antenna array), the reported group quantity of the terminal of a single array surface may be configured to be 1. As for a multi-array terminal, the reported group quantity of the multi-array terminal may be configured to be multiple groups, for example, the quantity of the reported groups may equal to the quantity of the array surfaces, or, in other words, one array corresponds to one group of reported data.

Particularly, each array of the multi-array terminal is generally provided with different positions on the terminal. Regarding the same one target measurement parameter, the measured values measured by each of the arrays are different. If the terminal reports merely one measured value, obviously its measurement accuracy is low. For positioning measurement, one measured value cannot reflect the position information of the terminal. Even if the positions of the different arrays are the same, the measured values measured by the arrays may also be different. Therefore, reporting merely one measured value cannot ensure the measurement accuracy. Therefore, in the embodiment of the present disclosure, the reported group quantity of the measured values of the target measurement parameter is added into the measurement-configuration information, whereby the multi-array terminal can report all of the measured values measured by each of the arrays, to increase the measurement accuracy.

Step 102: according to the measurement-configuration information, measuring the target measurement parameter.

The terminal, according to the measurement-configuration information, measures the target measurement parameter. for example, as a first example, the measurement-configuration information indicates that the target measurement signal is PRS, the target measurement parameter is RSTD, each of the transmission reception points (TRP) is provided with M=8 PRS resources, and the PRS resources, after different beamforming, point to different directions. Moreover, the network-side device configures that the reported quantity of the terminal is the RSTD information of N=6 TRPs, and indicates the configuration information of the PRS resources of the transmission reception points to the terminal. If the network-side device indicates that the reported group quantity of the terminal is K=1 group of the measured values, then the terminal determines the RSTD of each of the M=8 PRS resources sent by each of the TRPs, and obtains the corresponding measured values as follows:

$RSTD_0^i, RSTD_1^i, \ldots, RSTD_7^i$;

wherein i represents the i-th TRP.

Subsequently, one measured value is selected from the M=8 measured values, as the RSTD of the i-th TRP, which is expressed as $RSTD^i$. The terminal finally selects the RSTDs of N=6 TRPs, to form one group of measured values, for example:

$RSTD^0, RSTD^2, RSTD^4, RSTD^7, RSTD^8, RSTD^{10}$.

If the network-side device indicates that the reported group quantity of the terminal is K=2 groups of the measured values, then, according to the configuration of the network side, each of the arrays of the terminal independently represents the measurement on the RSTD, to obtain the corresponding M=8 RSTD measured values of the first array, which are expressed as $\{RSTD_{0,0}^i, RSTD_{0,1}^i, \ldots, RSTD_{0,7}^i\}$, and the corresponding M=8 RSTD measured values of the second array, which are expressed as $\{RSTD_{1,0}^i, RSTD_{1,1}^i, \ldots, RSTD_{1,7}^i\}$, wherein i represents TRPi. Subsequently, for each of the arrays, individually, one measured value is selected from the M=8 measured values, as the RSTD of the i-th TRP, which are expressed as $RSTD_0^i$ and $RSTD_1^i$. Finally, the terminal, regarding each of the arrays, selects the RSTDs of N=6 TRPs, respectively, so as to form two groups of the measured values, for example:

The first group of the measured values correspond to the first array, which are expressed as:

$RSTD_0^0, RSTD_0^2, RSTD_0^4, RSTD_0^7, RSTD_0^8, RSTD_0^{10}$.

The second group of the measured values correspond to the second array, which are expressed as:

$RSTD_1^1, RSTD_1^2, RSTD_1^3, RSTD_1^5, RSTD_1^8, RSTD_1^9$.

Step 103: sending the measured value of the target measurement parameter to the network-side device.

The terminal, after measuring the measured values of the target measurement parameter, reports to the network-side device according to the reported group quantity indicated in the measurement-configuration information. For the data in each of the groups of the measured values, according to the configuration of the network-side, the terminal may report the measured values of all of the target measurement signals (for example, all of the TRPs) to the network side, and it may also, according to one or more selected target measurement signals, send the measured values to the network side, which is not limited in the embodiments of the present disclosure.

In the above embodiment of the present disclosure, the method includes receiving a measurement-configuration information sent by a network-side device, wherein the measurement-configuration information includes at least a reported group quantity of a measured value of a target measurement parameter, and the target measurement parameter refers to a parameter of a target measurement signal; according to the measurement-configuration information, measuring the target measurement parameter; and sending the measured value of the target measurement parameter to the network-side device. By providing the reported group quantity in the measurement-configuration information, flexible configuration of the group quantity when a single-array terminal and a multi-array terminal are reporting the measured values is implemented. For a multi-array terminal, the measured values measured by each of the arrays may be grouped and then reported, to increase the measurement accuracy, and satisfy the demand on the measurement of a multi-array terminal in the 5G NR system. The embodiment of the present disclosure solves the problem that, in the conventional 5G NR system, the configuration information for reference signals has not been complete.

Optionally, in an embodiment of the present disclosure, in the measurement-configuration information, the reported group quantity of at least one of the target measurement parameters is at least two.

In other words, the measurement-configuration information may include various target measurement signals, and the target measurement parameter of each of the target measurement signals may also be multiple. Moreover, in case that the reported group quantity is at least two, for one target measurement signal, the reported group quantity of at least one of its target measurement parameters is two, to increase the measurement accuracy, and satisfy the requirements on the configuration information.

Optionally, in an embodiment of the present disclosure, the step 103 includes:

according to the reported group quantity, grouping the measured values of the target measurement parameter, wherein the measured values in a same one group are measured by a same one antenna array of the terminal; and sending each of the groups of the measured values to the network-side device, respectively.

If the reported group quantity is at least two, when the measurement is completed by the terminal device, groups the measured values of each of the target measurement parameters, and, in the process of the grouping, groups according to the antenna arrays, the measured values in the same one group are measured by the same one antenna array of the terminal. For example, referring to the above first example, the N=6 RSTD measured values of the first array are the first group, including:

$RSTD_0^0, RSTD_0^2, RSTD_0^4, RSTD_0^7, RSTD_0^8, RSTD_0^{10}$.

The N=6 RSTD measured values of the second array is the second group, including:

$RSTD_1^1, RSTD_1^2, RSTD_1^3, RSTD_1^5, RSTD_1^8, RSTD_1^9$.

Subsequently, each of the groups of the measured values is grouped and sent to the network-side device. Particularly, the measurement-configuration information may also contain the reported quantity of the TRP. Still referring to the above first example, the network-side device configures that the reported quantity of the terminal is the RSTD information of N=6 TRPs, while, in the actual measurement process, the terminal measures the RSTDs of all of the TRPs. For the sending to the network-side device, the terminal selects, from all of the TRPs, target TRPs of the reported quantity (i.e., 6), or selects, from the measured data of each of the antenna arrays, individually, target TRPs of the reported quantity, and sends the measured values of the target measurement signals of the target TRPs to the network-side device. Furthermore, the terminal may also send the RSRPs of all of the TRPs to the network-side device, and the network-side device screens the target TRPs.

Further, the above target TRPs in the TRPs or in the measured data of each of the antenna arrays are sorted in the order of a higher RSRP to a lower RSRP, and the measured values of the TRPs of the reported quantity that are sorted firstly are reported.

Optionally, in an embodiment of the present disclosure, the target measurement parameter includes at least one of a reference-signal time difference RSTD, a reference-signal receiving power RSRP, an angle of arrival AOA or a receiving-transmitting time difference RTTD.

RSTD refers to the value of the difference between the time of arrival (TOA) of the target measurement signal and the time of arrival of the reference signal. For example, regarding a PRS signal of a base station 1, its RSTD refers to the value obtained after the difference calculation between the TOA of the PRS signal and the TOA of the reference signal specified by the network-side.

RSRP refers to the linear average value of the received powers (in the unit of watt) of the resource elements (RE) of the reference signals carried by the measurement frequency bandwidth.

The angle of arrival (AOA) refers to the relative direction or angle between the receiving node and the anchor node that is calculated by predicting the direction of arrival of the transmitted node signal.

The target measurement parameter may further include the receiving-transmitting time difference (Rx-Tx Time Difference, RTTD).

When the target measurement parameter includes RSTD and/or RTTD, the measurement-configuration information contains a reference PRS of the target measurement signal.

Optionally, in an embodiment of the present disclosure, the target measurement signal includes at least one of a downlink positioning reference signal PRS, a channel-state-information reference signal CSI-RS and a tracking reference signal TRS.

In the above embodiment of the present disclosure, the method includes receiving a measurement-configuration information sent by a network-side device, wherein the measurement-configuration information includes at least a reported group quantity of a measured value of a target measurement parameter, and the target measurement parameter refers to a parameter of a target measurement signal; according to the measurement-configuration information, measuring the target measurement parameter; and sending the measured value of the target measurement parameter to the network-side device. By providing the reported group quantity in the measurement-configuration information, flexible configuration of the group quantity when a single-array terminal and a multi-array terminal are reporting the measured values is implemented. For a multi-array terminal, the measured values measured by each of the arrays may be grouped and then reported, to increase the measurement accuracy, and satisfy the demand on the measurement of a multi-array terminal in the 5G NR system.

The signal measuring method applied to a terminal side according to an embodiment of the present disclosure is described above, and a signal measuring method applied to a network-side device will be described below with reference to the drawings.

Figure 2:
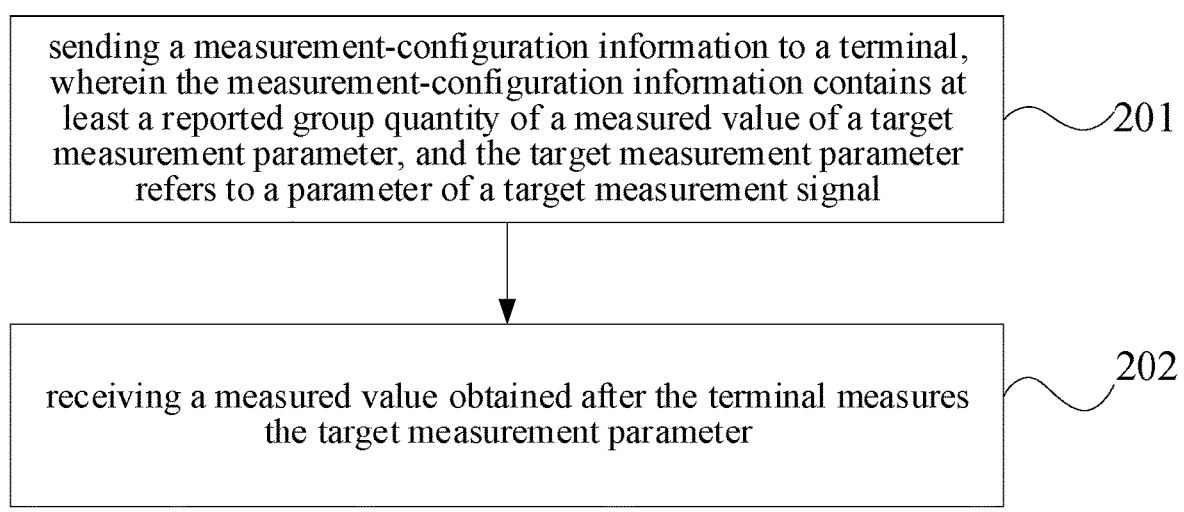
FIG. 2 shows a flow chart of the signal measuring method applied to a network-side device according to an embodiment of the present disclosure.

Referring to FIG. 2, an embodiment of the present disclosure provides a signal measuring method, applied to a network-side device, wherein the method includes:

Step 201: sending a measurement-configuration information to a terminal, wherein the measurement-configuration information includes at least a reported group quantity of a measured value of a target measurement parameter, and the target measurement parameter refers to a parameter of a target measurement signal.

The network-side device may be a base station, a positioning server and so on. The network-side device configures the measurement-configuration information for the terminal, wherein the measurement-configuration information is a configuration information for measuring the target measurement signal. The target measurement signal (type) may be PRS, CSI-RS and so on.

The target measurement parameter (type) may be RSTD, the reference-signal receiving power RSRP and so on.

The measurement-configuration information includes the target measurement parameter of the target measurement signal; in other words, the measurement-configuration information indicates the type of the measurement signal that the terminal requires to measure, i.e., the target measurement signal, and the type of the target measurement parameter of the target measurement signal. It can be understood that the type for both of the target measurement signal and the target measurement parameter in the measurement-configuration information may be one or more.

The measurement-configuration information includes the reported group quantity of the measured values of the target measurement parameter. The reported group quantity refers to the group quantity that the terminal is required to report to the network-side device after the measurement on the target measurement parameter. The reported group quantity may be one or at least two groups. Particularly, for a terminal of a single array (the array refers to an antenna array), its reported group quantity may be configured to be 1. However, for a multi-array terminal, its reported group quantity may be configured to be multiple groups, for example, equal to the quantity of the arrays, or, in other words, one array corresponds to one group of reported data.

Particularly, each array of the multi-array terminal is generally provided with different positions on the terminal. Regarding the same one target measurement parameter, the measured values measured by each of the arrays are different. Therefore, if the terminal reports merely one measured value, obviously its measurement accuracy is low. For positioning measurement, one measured value cannot reflect the position information of the terminal. Even if the positions of the different arrays are the same, the measured values that they measure might also be different. Therefore, reporting merely one measured value cannot ensure the measurement accuracy. Therefore, in the embodiment of the present disclosure, the reported group quantity of the measured values of the target measurement parameter is added into the measurement-configuration information, whereby the multi-array terminal can report all of the measured values measured by each of the arrays, to increase the measurement accuracy.

Step 202: receiving a measured value obtained after the terminal measures the target measurement parameter.

The network-side device receives a measured value obtained after the terminal measures the target measurement parameter. As a second example, the measurement-configuration information indicates that the target measurement signal is PRS, the target measurement parameter is RSTD, the network-side device provides M=8 PRS resources for each of the transmission reception points TRP, and the PRS resources, after different beamforming, point to different directions. Moreover, the network-side device configures that the reported quantity of the terminal is the RSTD information of N=6 TRPs, and indicates the configuration information of the PRS resources of the transmission reception points to the terminal.

If the network-side device indicates that the reported group quantity of the terminal is K=1 group of the measured values, then the terminal determines the RSTD of each of the M=8 PRS resources sent by each of the TRPs, and obtains one group of measured values as follows:

$RSTD_0^i, RSTD_2^i, \ldots, RSTD_7^i$;

wherein i represents the i-th TRP. Subsequently, the terminal selects one measured value from the M=8 measured values, as the RSTD of the i-th TRP, which is expressed as $RSTD^i$. The terminal finally selects the RSTDs of N=6 TRPs, to form one group of measured values, for example:

$RSTD^0, RSTD^2, RSTD^4, RSTD^7, RSTD^8, RSTD^{10}$.

If the network-side device indicates that the reported group quantity of the terminal is K=2 groups of the measured values, then, according to the configuration of the network-side, each of the arrays of the terminal independently represents the measurement on the RSTD, to obtain the corresponding M=8 RSTD measured values of the first array, which are expressed as $\{RSTD_{0,0}^i, RSTD_{0,1}^i, \ldots, RSTD_{0,7}^i\}$, and the corresponding M=8 RSTD measured values of the second array, which are expressed as $\{RSTD_{1,0}^i, RSTD_{1,1}^i, \ldots, RSTD_{1,7}^i\}$, wherein i represents TRPi. Subsequently, the terminal, for each of the arrays, selects one measured value from the M=8 measured values, respectively, as the RSTD of the i-th TRP, which are expressed as $RSTD_0^i$ and $RSTD_1^i$.

Finally, the terminal, regarding each of the arrays, selects the RSTDs of N=6 TRPs, respectively, so as to form two groups of the measured values, for example:

The first group of the measured values correspond to the first array, which are expressed as:

$RSTD_0^0, RSTD_0^2, RSTD_0^4, RSTD_0^7, RSTD_0^8, RSTD_0^{10}$.

The second group of the measured values correspond to the second array, which are expressed as:

$RSTD_1^1, RSTD_1^2, RSTD_1^3, RSTD_1^5, RSTD_1^8, RSTD_1^9$.

The terminal, after measuring the measured values of the target measurement parameter, reports to the network-side device according to the reported group quantity indicated in the measurement-configuration information. The network-side device, after receiving the measured values, may perform subsequent operations according to the measured values, for example, positioning the terminal, and so on.

In the above embodiment of the present disclosure, the network-side device sends a measurement-configuration information to a terminal, wherein the measurement-configuration information includes at least a reported group quantity of a measured value of a target measurement parameter, and the target measurement parameter refers to a parameter of a target measurement signal; and receives a measured value obtained after the terminal measures the target measurement parameter. By providing the reported group quantity in the measurement-configuration information, flexible configuration of the group quantity when a single-array terminal and a multi-array terminal are reporting the measured values is implemented. For a multi-array terminal, the measured values measured by each of the arrays may be grouped and then reported, to increase the measurement accuracy, and satisfy the demand on the measurement of a multi-array terminal in the 5G NR system. The embodiment of the present disclosure solves the problem that, in the conventional 5G NR system, the configuration information for reference signals is not completed.

Optionally, in an embodiment of the present disclosure, in the measurement-configuration information, the reported group quantity of at least one of the target measurement parameters is at least two.

The measurement-configuration information may include various target measurement signals, and the target measurement parameter of each of the target measurement signals may also be multiple. Moreover, in case that the reported group quantity is at least two, for one target measurement signal, the reported group quantity of at least one of its target measurement parameters is two, to increase the measurement accuracy, and satisfy the requirements on the configuration information.

Optionally, in an embodiment of the present disclosure, after the step 202, the method includes:

according to the measured value of the target measurement parameter, positioning the terminal.

The network-side, after receiving the measured values of the target measurement parameter, determines a positioning parameter among the target measurement parameters, wherein the positioning parameter refers to a target measurement parameter which reported group quantity is at least two, and, according to the measured values of the positioning signal, performs predetermined multi-point positioning to the terminal, to increase the positioning accuracy.

However, in the prior art, for one base station and one target measurement parameter, the terminal reports merely one measured value. When the terminal is provided with a plurality of antenna arrays, considering the placement positions of the different arrays, the different arrays may obtain different RSTD measured values, and reporting merely one RSTD result cannot truly reflect the position information of the terminal. Even if the placement positions of the different arrays are the same, reporting merely one RSTD cannot ensure the accuracy of the subsequent positioning calculation.

Optionally, in an embodiment of the present disclosure, the target measurement parameter includes at least one of a reference-signal time difference RSTD, a reference-signal receiving power RSRP, an angle of arrival AOA or a receiving-transmitting time difference RTTD.

RSTD refers to the value of the difference between the time of arrival (TOA) of the target measurement signal and the time of arrival of the reference signal. For example, regarding a PRS signal of a base station 1, its RSTD refers to the value obtained after the difference calculation between the TOA of the PRS signal and the TOA of the reference signal specified by the network-side.

RSRP refers to the linear average value of the received powers (in the unit of watt) of the resource elements (RE) of the reference signals carried by the measurement frequency bandwidth.

The angle of arrival (AOA) refers to the relative direction or angle between the receiving node and the anchor node that is calculated by predicting the direction of arrival of the transmitted node signal.

The target measurement parameter may further include the receiving-transmitting time difference (Rx-Tx Time Difference, RTTD).

When the target measurement parameter includes RSTD and/or RTTD, the measurement-configuration information contains a reference PRS of the target measurement signal.

Optionally, in an embodiment of the present disclosure, the target measurement signal includes at least one of a downlink positioning reference signal PRS, a channel-state-information reference signal CSI-RS and a tracking reference signal TRS.

In the above embodiment of the present disclosure, the network-side device sends a measurement-configuration information to a terminal, wherein the measurement-configuration information contains at least a reported group quantity of a measured value of a target measurement parameter, and the target measurement parameter refers to a parameter of a target measurement signal; and receives a measured value obtained after the terminal measures the target measurement parameter. By providing the reported group quantity in the measurement-configuration information, flexible configuration of the group quantity when a single-array terminal and a multi-array terminal are reporting the measured values is implemented. For a multi-array terminal, the measured values measured by each of the arrays may be grouped and then reported, to increase the measurement accuracy, and satisfy the demand on the measurement of a multi-array terminal in the 5G NR system.

The signal measuring method according to the embodiments of the present disclosure is described by taking positioning measurement as an example with reference to a third example.

Regarding the terminal side, it measures the reference signal that is configured at the network-side, to obtain measured quantities (i.e., measured parameters) of one or more types. For the measured quantities of each of the types, one or more groups of the measured values are reported. The one or more reported groups of the measured values are configured by the network side, and the types of the measured quantities include at least one of RSTD, RSRP, AOA and receiving-transmitting time difference. Each of the groups of the measured values is a set of the measured values of one of the antenna arrays of the terminal with respect to different measurement base stations.

Regarding the network-side, the network-side configures for the terminal the configuration information of the reference signals of a plurality of sending side, and configures the types of the measured quantities that the terminal requires to report. At the same time, the network side, for the type of each of the measured quantities to be reported, configures the reported group quantity of the measured values required to be reported. Subsequently, the network side receives the measured quantities reported by the terminal. The types of the measured quantities include at least one of RSTD, RSRP, AOA and receiving-transmitting time difference. The network side configures the reported group quantity of the measured values required to be reported, including the array information indicated in the reporting by the network side according to the terminal capability, and configures the terminal to report one or more groups of the measured values, wherein each of the antenna arrays corresponds to one group of the reported data.

In the first step, the terminal reports via the UE capacity, and indicates the network-side device that it has 2 arrays.

In the second step, the network-side device configures the measurement-configuration information for the terminal.

Each of the TRPs is provided with M=8 PRS resources, and the PRS resources, after different beamforming, point to different directions. The network side configures that the reported quantity of the terminal is the RSTD information of N=6 TRPs, and at the same time the network side indicates that the reported group quantity of the terminal is K=2 groups of the measured values, and indicates the configuration information of the PRS resources of the transmission reception points to the terminal. In addition, the network side indicates the terminal to use the first PRS resource of the first TRP as the reference PRS, for the calculation of the RSTD.

In the third step, the terminal measures according to the measurement-configuration information.

The RSTD of each of the M=8 PRS resources sent by each of the TRPs is determined. According to the configuration of the network side, each of the antenna arrays independently performs the measurement on the RSTD, so as to obtain 8 RSTD measured values of the first array, which are expressed as the first group: $\{RSTD_{0,0}{}^i, RSTD_{0,1}{}^i, \ldots, RSTD_{0,7}{}^i\}$, and 8 RSTD measured values of the second array, which are expressed as the second group: $\{RSTD_{1,0}{}^i, RSTD_{1,1}{}^i, \ldots, RSTD_{1,7}{}^i\}$, wherein i represents TRPi.

For example, it is assumed that the terminal, according to the rule of smallest TOA, determines the first group as the RSTD measurement result of the TRP3, which are expressed as $RSTD_0{}^3$ and $RSTD_1{}^3$.

The terminal determines the RSTD measurement results of all of the TRPs, determines from them N=6 TRPs for the information reporting of the RSTD, or reports all of the RSTD measurement results of all of the TRPs.

Furthermore, the process of determining N=6 TRPs for the information reporting of the RSTD includes two modes:

The first mode: 6 TRPs which RSRPs are the strongest in the PRS resources of all of the TRPs are used as the TRP reported to the RSTDs. For example, the terminal determines TRP0, TRP3, TRP4, TRP6, TRP8 and TRP10 as the TRPs reported to the RSTDs.

The second mode: 6 TRPs that are measured from the first array and which RSRPs are the strongest in the PRS resources of all of the TRPs are used as the TRPs reported to the first group of the RSTDs, and 6 TRPs that are measured from the second array and which RSRPs are the strongest in the PRS resources of all of the TRPs are used as the TRPs reported to the second group of the RSTDs. For example, the terminal determines TRP0, TRP3, TRP4, TRP6, TRP8 and TRP10 as the TRPs reported to the first group of the RSTDs, and determines TRP0, TRP2, TRP5, TRP6, TRP7 and TRP8 as the TRPs reported to the second group of the RSTDs.

In the first mode or the second mode, the terminal groups the RSTDs of the 6 TRPs according to the arrays into the first group of the RSTDs, which includes the RSTDs of the 6 TRPs measured from the first array, which are expressed as $\{RSTD_0{}^i, i=0, 3, 4, 6, 8, 10\}$; and the second group of the RSTDs, which includes the RSTDs of the 6 TRPs measured from the second array, which are expressed as $\{RSTD_1{}^i, i=0, 2, 5, 6, 7, 8\}$.

In the third step, the terminal reports the first group of the RSTDs and the second group of the RSTDs to the network-side device.

In the fourth step, the network-side device locates the terminal according to the first group of the RSTDs and the second group of the RSTDs. The network-side device may obtain a positioning result based on the first group of the RSTDs, obtain another positioning result based on the second group of the RSTDs, and subsequently perform multi-point positioning based on the overlapping area of the two positioning results, to increase the positioning accuracy.

A multi-array terminal configures a plurality of groups of the measured values that are reported. The network side performs positioning calculation based on the plurality of groups of the reported measured values, which can increase the positioning accuracy.

The signal measuring method according to an embodiment of the present disclosure is described above, and a terminal and a network-side device according to an embodiment of the present disclosure will be described below with reference to the drawings.

Figure 3:
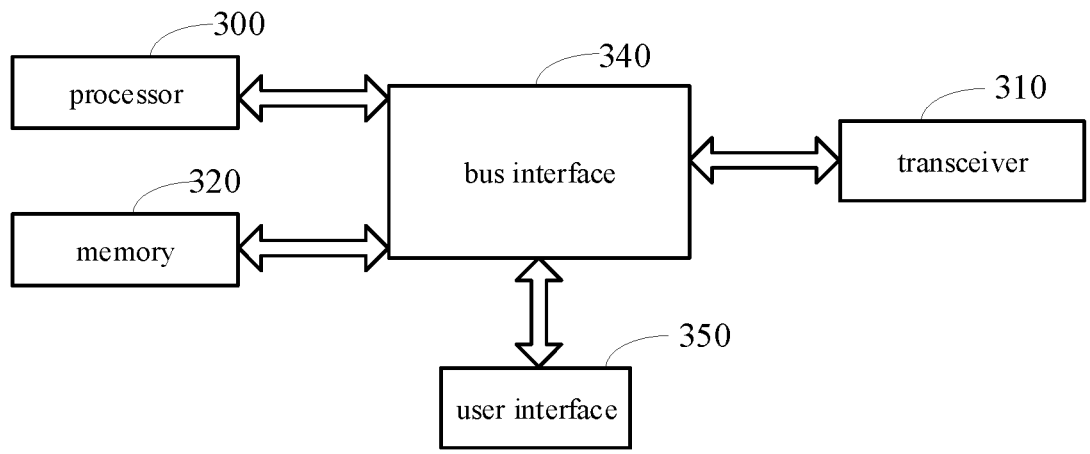
FIG. 3 shows a structural block diagram of the terminal according to an embodiment of the present disclosure.

Referring to FIG. 3, an embodiment of the present disclosure provides a terminal, comprising a processor 300 and a memory 320 connected to the processor 300 via a bus interface 340. The memory 320 is configured to store the programs and the data that are used by the processor 300 for the execution of operations. When the processor 300 invokes and executes the programs and the data that are stored in the memory 320, the processor 300 executes the following process.

A transceiver 310 is connected to the bus interface 340, and is configured to receive and transmit data under the control of the processor 300.

Particularly, the processor 300, when executing the computer program, performs the following steps:

receiving a measurement-configuration information sent by a network-side device, wherein the measurement-configuration information includes at least a reported group quantity of a measured value of a target measurement parameter, and the target measurement parameter refers to a parameter of a target measurement signal;

according to the measurement-configuration information, measuring the target measurement parameter; and sending the measured value of the target measurement parameter to the network-side device.

Optionally, in an embodiment of the present disclosure, in the measurement-configuration information, the reported group quantity of at least one of the target measurement parameters is at least two.

Optionally, in an embodiment of the present disclosure, the processor 300, when executing the computer program, performs the following steps:

according to the reported group quantity, grouping the measured values of the target measurement parameter, wherein the measured values in a same one group are measured by a same one antenna array of the terminal; and sending each of the groups of the measured values individually to the network-side device.

Optionally, in an embodiment of the present disclosure, the target measurement parameter includes at least one of a reference-signal time difference RSTD, a reference-signal receiving power RSRP, an angle of arrival AOA or a receiving-transmitting time difference RTTD.

Optionally, in an embodiment of the present disclosure, the target measurement signal includes at least one of a downlink positioning reference signal PRS, a channel-state-information reference signal CSI-RS and a tracking reference signal TRS.

Furthermore, in FIG. 3, the bus architecture may include buses and bridges of any quantity that are interconnected, which are particularly linked by various electric circuit of one or more processors represented by the processor 300 and a memory represented by the memory 320. The bus architecture may also link together various other electric circuits of, for example, a peripheral device, a voltage regulator and a power managing circuit, which are well known in the art and thus are not described further herein. The bus interface provides the interfaces. The transceiver 310 may be a plurality of elements, i.e., including an transmitter and a receiver, and provides a unit that is configured to communicate with various other devices via a transmission medium, wherein the transmission medium includes a transmission medium such as a wireless channel, a wired channel and a fiber optic cable. For different user devices, the user interface 350 may also be an interface that can be externally or internally connected to a required device, wherein the connected device includes but is not limited to a keypad, a display, a loudspeaker, a microphone, a joystick and so on.

The processor 300 is configured to manage the bus architecture and routine processing. The memory 320 may store the data that are used by the processor 300 for the execution of operations.

Optionally, the processor 300 may be a CPU (central processing unit), an ASIC (Application Specific Integrated Circuit), an FPGA (Field-Programmable Gate Array) or a CPLD (Complex Programmable Logic Device). The processor 300 may also employ a multi-core architecture.

A person skilled in the art can understand that all or some of the steps for implementing the above embodiment may be completed by hardware, and may also be completed by a computer program instructing relevant hardware, wherein the computer program contains an instruction for executing some or all of the steps of the above method, the computer program may be stored in a readable storage medium, and the storage medium may be a storage medium in any form.

In the above embodiment of the present disclosure, the method comprises receiving a measurement-configuration information sent by a network-side device, wherein the measurement-configuration information includes at least a reported group quantity of a measured value of a target measurement parameter, and the target measurement parameter refers to a parameter of a target measurement signal; according to the measurement-configuration information, measuring the target measurement parameter; and sending the measured value of the target measurement parameter to the network-side device. By providing the reported group quantity in the measurement-configuration information, flexible configuration of the group quantity when a single-array terminal and a multi-array terminal are reporting the measured values is implemented. For a multi-array terminal, the measured values measured by each of the arrays may be grouped and then reported, to increase the measurement accuracy, and satisfy the demand on the measurement of a multi-array terminal in the 5G NR system.

Figure 4:
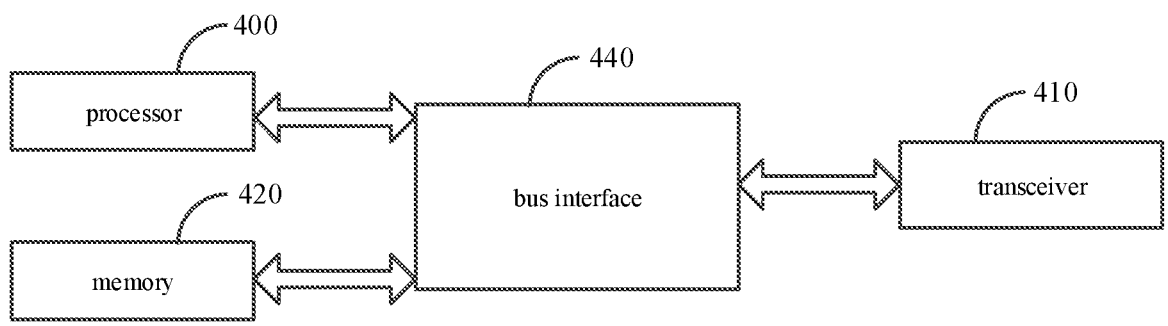
FIG. 4 shows a structural block diagram of the network-side device according to an embodiment of the present disclosure.

Referring to FIG. 4, an embodiment of the present disclosure further provides a network-side device. The network-side device includes: a processor 400; and a memory 420 connected to the processor 400 by a bus interface 440, and a transceiver 410 connected to the processor 400 by the bus interface 440. The memory 420 is configured to store the programs and the data that are used by the processor 400 for the execution of operations. The transceiver 410 transmits data information or a pilot frequency, and the transceiver 410 also receives an uplink control channel. When the processor 400 invokes and executes the programs and the data that are stored in the memory 420, the processor 400 implements the following function: sending a measurement-configuration information to a terminal, wherein the measurement-configuration information includes at least a reported group quantity of a measured value of a target measurement parameter, and the target measurement parameter refers to a parameter of a target measurement signal; and receiving a measured value obtained after the terminal measures the target measurement parameter.

Optionally, in an embodiment of the present disclosure, in the measurement-configuration information, the reported group quantity of at least one of the target measurement parameters is at least two.

Optionally, in an embodiment of the present disclosure, the processor 400, when executing the computer program, performs the following steps:

determining a positioning parameter among the target measurement parameters, wherein the positioning parameter refers to a target measurement parameter whose reported group quantity is at least two; and according to a measured value of the positioning parameter, performing multi-point positioning to the terminal.

Optionally, in an embodiment of the present disclosure, the target measurement parameter includes at least one of a reference-signal time difference RSTD, a reference-signal receiving power RSRP, an angle of arrival AOA or a receiving-transmitting time difference RTTD.

Optionally, in an embodiment of the present disclosure, the target measurement signal includes at least one of a downlink positioning reference signal PRS, a channel-state-information reference signal CSI-RS and a tracking reference signal TRS.

A person skilled in the art can understand that all or some of the steps for implementing the above embodiment may be completed by hardware, and may also be completed by a computer program instructing relevant hardware, wherein the computer program contains an instruction for executing some or all of the steps of the above method, the computer program may be stored in a readable storage medium, and the storage medium may be a storage medium in any form.

In the above embodiment of the present disclosure, the network-side device sends a measurement-configuration information to a terminal, wherein the measurement-configuration information includes at least a reported group quantity of a measured value of a target measurement parameter, and the target measurement parameter refers to a parameter of a target measurement signal; and receives a measured value obtained after the terminal measures the target measurement parameter. By providing the reported group quantity in the measurement-configuration information, flexible configuration of the group quantity when a single-army terminal and a multi-array terminal are reporting the measured values is implemented. For a multi-array terminal, the measured values measured by each of the arrays may be grouped and then reported, to increase the measurement accuracy, and satisfy the demand on the measurement of a multi-array terminal in the 5G NR system.

Figure 5:
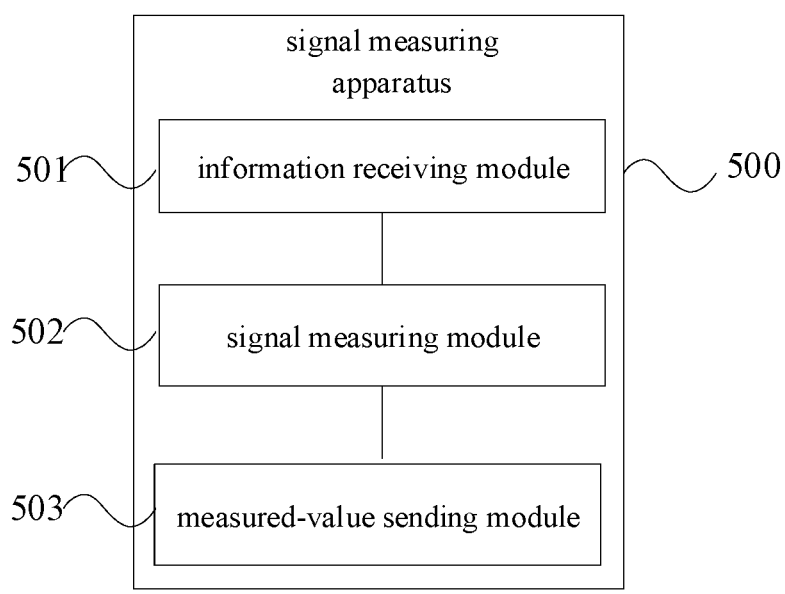
FIG. 5 shows a schematic diagram of the modules of the terminal according to an embodiment of the present disclosure.

Referring to FIG. 5, an embodiment of the present disclosure further provides a signal measuring apparatus 500, applied to a terminal, wherein the apparatus 500 includes:

an information receiving module 501 configured for receiving a measurement-configuration information sent by a network-side device, wherein the measurement-configuration information includes at least a reported group quantity of a measured value of a target measurement parameter, and the target measurement parameter refers to a parameter of a target measurement signal;

a signal measuring module 502 configured for, according to the measurement-configuration information, measuring the target measurement parameter; and a measured-value sending module 503 configured for sending the measured value of the target measurement parameter to the network-side device.

Optionally, in an embodiment of the present disclosure, in the measurement-configuration information, the reported group quantity of at least one of the target measurement parameters is at least two.

Optionally, in an embodiment of the present disclosure, the measured-value sending module 503 includes:

a grouping submodule configured for, according to the reported group quantity, grouping the measured values of the target measurement parameter, wherein the measured values in a same one group are measured by a same one antenna array of the terminal; and a sending submodule configured for sending each of the groups of the measured values individually to the network-side device.

Optionally, in an embodiment of the present disclosure, the target measurement parameter includes at least one of a reference-signal time difference RSTD, a reference-signal receiving power RSRP, an angle of arrival AOA or a receiving-transmitting time difference RTTD.

Optionally, in an embodiment of the present disclosure, the target measurement signal includes at least one of a downlink positioning reference signal PRS, a channel-state-information reference signal CSI-RS and a tracking reference signal TRS.

In the above embodiment of the present disclosure, the information receiving module 501 receives a measurement-configuration information sent by a network-side device, wherein the measurement-configuration information includes at least a reported group quantity of a measured value of a target measurement parameter, and the target measurement parameter refers to a parameter of a target measurement signal; the signal measuring module 502, according to the measurement-configuration information, measures the target measurement parameter; and the measured-value sending module 503 sends the measured value of the target measurement parameter to the network-side device. By providing the reported group quantity in the measurement-configuration information, flexible configuration of the group quantity when a single-array terminal and a multi-array terminal are reporting the measured values is implemented. For a multi-array terminal, the measured values measured by each of the arrays may be grouped and then reported, to increase the measurement accuracy, and satisfy the demand on the measurement of a multi-array terminal in the 5G NR system.

Figure 6:
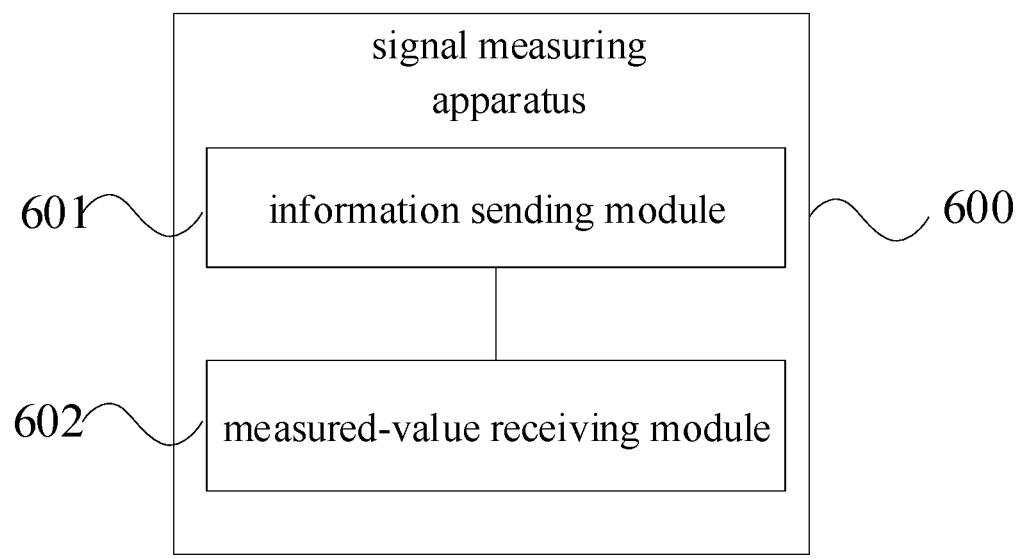
FIG. 6 shows a schematic diagram of the modules of the network-side device according to an embodiment of the present disclosure.

Referring to FIG. 6, an embodiment of the present disclosure further provides a signal measuring apparatus 600, applied to a network-side device, wherein the apparatus 600 comprises:

an information sending module 601 configured for sending a measurement-configuration information to a terminal, wherein the measurement-configuration information includes at least a reported group quantity of a measured value of a target measurement parameter, and the target measurement parameter refers to a parameter of a target measurement signal; and a measured-value receiving module 602 configured for receiving a measured value obtained after the terminal measures the target measurement parameter.

Optionally, in an embodiment of the present disclosure, in the measurement-configuration information, the reported group quantity of at least one of the target measurement parameters is at least two.

Optionally, in an embodiment of the present disclosure, the apparatus 600 further comprises: a positioning module configured for, according to the measured value of the target measurement parameter, positioning the terminal.

Optionally, in an embodiment of the present disclosure, the target measurement parameter includes at least one of a reference-signal time difference RSTD, a reference-signal receiving power RSRP, an angle of arrival AOA or a receiving-transmitting time difference RTTD.

Optionally, in an embodiment of the present disclosure, the target measurement signal includes at least one of a downlink positioning reference signal PRS, a channel-state-information reference signal CSI-RS and a tracking reference signal TRS.

In the above embodiment of the present disclosure, the information sending module 601 sends a measurement-configuration information to a terminal, wherein the measurement-configuration information includes at least a reported group quantity of a measured value of a target measurement parameter, and the target measurement parameter refers to a parameter of a target measurement signal; and the measured-value receiving module 602 receives a measured value obtained after the terminal measures the target measurement parameter. By providing the reported group quantity in the measurement-configuration information, flexible configuration of the group quantity when a single-array terminal and a multi-array terminal are reporting the measured values is implemented. For a multi-array terminal, the measured values measured by each of the arrays may be grouped and then reported, to increase the measurement accuracy, and satisfy the demand on the measurement of a multi-array terminal in the 5G NR system.

An embodiment of the present disclosure further provides a computer-readable storage medium, wherein the computer-readable storage medium stores a computer program, and the computer program, when executed by the processor, implements the steps of the embodiments of the signal measuring method stated above, to obtain the same technical effect, which, in order to avoid replication, is not discussed here further. The computer-readable storage medium is, for example, a Read-Only Memory (referred to for short as ROM), a Random Access Memory (referred to for short as RAM), a diskette, an optical disc and so on.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Part or all of the modules may be selected according to the actual demands to realize the purposes of the solutions of the embodiments. A person skilled in the art can understand and implement the technical solutions without paying creative work.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A method for signal measuring, applied to a terminal, wherein the method comprises:
receiving a measurement-configuration information sent by a network-side device, wherein the measurement-configuration information at least comprises a target measurement parameter and a reported group quantity, wherein the target measurement parameter refers to a parameter of a target measurement signal and wherein the reported group quantity is a total number of groups of measured values of the target measurement parameter;
measuring the target measurement parameter according to the measurement-configuration information; and
sending the measured values of the target measurement parameter to the network-side device,
wherein the step of sending the measured values of the target measurement parameter to the network-side device comprises:
grouping the measured values of the target measurement parameter according to the reported group quantity, wherein the measured values in a same group are measured by a same antenna array of the terminal; and
sending each of groups of the measured values, respectively, to the network-side device.

2. The method for signal measuring according to claim 1, wherein in the measurement-configuration information, the reported group quantity is at least two.

3. The method for signal measuring according to claim 1, wherein the target measurement parameter at least comprises one of a reference-signal time difference, a reference-signal receiving power, an angle of arrival or a receiving-transmitting time difference.

4. The method for signal measuring according to claim 1, wherein the target measurement signal at least comprises one of a downlink positioning reference signal, a channel-state-information reference signal and a tracking reference signal.

5. A terminal, comprising a transceiver, a memory, a processor and a computer program stored in the memory and is executable in the processor, wherein the processor performs the following steps when executing the computer program:
receiving a measurement-configuration information sent by a network-side device, wherein the measurement-configuration information at least comprises a reported group quantity, wherein the reported group quantity is a total number of groups of measured values of a target measurement parameter and wherein the target measurement parameter refers to a parameter of a target measurement signal;
measuring the target measurement parameter according to the measurement-configuration information; and
sending the measured values of the target measurement parameter to the network-side device,
wherein the processor performs the following steps, when executing the computer program:
grouping the measured values of the target measurement parameter according to the reported group quantity, wherein the measured values in a same group are measured by a same antenna array of the terminal; and
sending each of groups of the measured values, respectively, to the network-side device.

6. The terminal according to claim 5, wherein in the measurement-configuration information, the reported group quantity of at least one of the target measurement parameters is at least two.

7. The terminal according to claim 5, wherein the target measurement parameter at least comprises one of a reference-signal time difference, a reference-signal receiving power, an angle of arrival or a receiving-transmitting time difference.

8. The terminal according to claim 5, wherein the target measurement signal at least comprises one of a downlink positioning reference signal, a channel-state-information reference signal and a tracking reference signal.

9. A network-side device, comprising a transceiver, a memory, a processor and a computer program stored in the memory and is executable in the processor, wherein the processor performs the method according to claim 1,
wherein the processor performs the following steps when executing the computer program:
determining a positioning parameter of the target measurement parameter, wherein the positioning parameter refers to a target measurement parameter with at least two reported groups; and
performing multi-point positioning to the terminal according to a measured value of the positioning parameter.

10. The network-side device according to claim 9, wherein in the measurement-configuration information, the reported group quantity is at least two.

11. The network-side device according to claim 9, wherein the target measurement signal at least comprises one of a downlink positioning reference signal, a channel-state-information reference signal and a tracking reference signal.

12. A computer-readable medium, wherein the computer-readable medium stores the computer program, when the computer program is executed by an electronic device, the method according to claim 1 is executed.

* * * * *